United States Patent [19]

Ou-Yang

[11] Patent Number: 5,145,929
[45] Date of Patent: * Sep. 8, 1992

[54] PRESSURE-ACTIVATED ADHESIVES

[75] Inventor: David T. Ou-Yang, St. Paul, Minn.

[73] Assignee: Minnesota Mining and Manufacturing Company, St. Paul, Minn.

[*] Notice: The portion of the term of this patent subsequent to Jun. 19, 2007 has been disclaimed.

[21] Appl. No.: 722,362

[22] Filed: Jun. 24, 1991

Related U.S. Application Data

[63] Continuation of Ser. No. 305,155, Feb. 1, 1989, abandoned.

[51] Int. Cl.$^5$ .................. C08F 236/06; C08F 236/12
[52] U.S. Cl. ................................ 526/338; 526/335; 526/341; 526/342
[58] Field of Search ........................................ 526/338

[56] References Cited

U.S. PATENT DOCUMENTS

| | | | |
|---|---|---|---|
| 2,378,694 | 6/1945 | Fryling | 260/84.5 |
| 2,491,477 | 12/1949 | Chmiel | 154/43 |
| 2,535,852 | 12/1950 | Hatfield | 526/338 |
| 2,554,268 | 5/1951 | Rose et al. | 260/82.7 |
| 3,251,713 | 5/1966 | Crone | 427/208.8 |
| 3,380,938 | 4/1968 | Jack et al. | 260/4 |
| 3,629,373 | 12/1971 | Embree | 526/914 |
| 3,970,623 | 7/1976 | Feeney et al. | 260/27 BB |
| 4,048,124 | 9/1977 | Ishikawa | 525/211 |
| 4,102,835 | 7/1978 | Freeman et al. | 260/5 |
| 4,299,942 | 11/1981 | Piestert | 526/323.1 |
| 4,935,273 | 6/1990 | Ou-Yang | 428/35.7 |
| 4,977,003 | 12/1990 | Brown | 428/35.5 |

FOREIGN PATENT DOCUMENTS 1215796 12/1970 United Kingdom .

*Primary Examiner*—Joseph L. Schofer
*Assistant Examiner*—Fred Zitomer
*Attorney, Agent, or Firm*—Gary L. Griswold; Walter N. Kirn; David L. Weinstein

[57] ABSTRACT

Pressure-activated adhesive that is a copolymer of butadiene and acrylonitrile or methacrylonitrile. The copolymer has a single glass transition temperature of no higher than about −25° C., a nitrile content of no greater than about 31%, preferably of from about 18% by weight to about 30% by weight, a Mooney viscosity of at least 95 (measured according to ASTM D1646-87 at 100° C. for 4 minutes), preferably from about 120 to about 150. The copolymer is not cross-linked, and the amount of vinyl groups in the copolymer should not exceed 10% by weight. The adhesive can be used to form an adhesive layer of an adhesive tape.

8 Claims, No Drawings

PRESSURE-ACTIVATED ADHESIVES

This is a continuation of application Ser. No. 07/305,155, filed Feb. 1, 1989, now abandoned.

FIELD OF THE INVENTION

The present invention relates to pressure-activated adhesives and to articles using same.

BACKGROUND ART

U.S. Pat. No. 2,554,268 discloses that emulsion copolymerizates of a butadiene-1,3 and acrylonitrile or methacrylonitrile containing less than 25% of combined nitrile are more uniform in composition and therefore possess improved general characteristics if close control of the concentration of nitrile in the reaction system is maintained. According to that patent, emulsion copolymerizates of a butadiene-1,3 and acrylonitrile or methacrylonitrile containing less than 25% of combined nitrile possess improved oil resistance, tensile strength, elongation, modulus and compression set properties provided that the nitrile is added portionwise to the reaction mixture. The improvement in the physical properties of the polymer obtained by the portionwise rather than single addition of the nitrile is greater in copolymers of lower combined nitrile content, i.e., the improvement is greater in copolymers containing 12-15% of combined nitrile than in those containing 20% of combined nitrile and greater in copolymers containing 20% of combined nitrile than in those containing 25% of combined nitrile. U.S. Pat. No. 2,378,694 discloses a method of copolymerizing a butadiene-1,3 hydrocarbon and an alpha-methylene nitrile of the formula

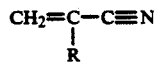

where R is a member of the class consisting of hydrogen and alkyl, in the form of an aqueous emulsion in the presence of peroxynitric acid having the formula $HNO_4$.

British Patent Specification 1,215,796 discloses an adhesive composition which comprises butadieneacrylonitrile copolymer (NBR) obtained by emulsion polymerization in the presence of dimethyl xanthogen disulfide as a molecular weight regulator. Preferably, a butadiene-acrylonitrile polymer having 25-50% by weight acrylonitrile bonded therein is used. Preferably, also the Mooney viscosity ML (100° C.) of the butadiene-acrylonitrile copolymer ranges from 70 to 100. The adhesive composition of this patent specification usually comprises NBR obtained by using dimethyl xanthogen disulfide as molecular weight regulator and other ingredients such as, for example, phenol resin, filler, vulcanizing agent, vulcanization accelerator and the like, and they are usually dissolved in a solvent such as a ketone. The adhesive composition of this patent specification can be widely used as general and industrial adhesives in, for example, the shoe industry, adhesion of structural material for aircraft, brake-shoes and brake-liners of motor cars and the like.

The aforementioned adhesives either do not exhibit high levels of adhesion to high energy polymeric surfaces or exhibit a high level of finger tack.

SUMMARY OF THE INVENTION

In one aspect of the present invention, there is provided a pressure-activated adhesive composition comprising a butadiene-nitrile random copolymer having a single glass transition temperature of less than about $-25°$ C., a nitrile content of no greater than about 31% by weight, preferably of from about 18% by weight to about 30% by weight, and a Mooney viscosity of at least 95, preferably from about 120 to about 150. The copolymer is substantially free of cross-links, and the amount of vinyl groups in the copolymer should not exceed 10% by weight.

The composition demonstrates especially high adhesion to polymeric surfaces having high polarity, such as, for example, polyvinyl chloride, polyester, polycarbonate, and polyvinylidene chloride.

DETAILED DESCRIPTION

The butadiene-nitrile random copolymers utilized in the adhesive composition are preferably butadiene-acrylonitrile copolymers or butadiene-methacrylonitrile copolymers, i.e., the nitrile moieties are preferably selected from acrylonitrile or methacrylonitrile. In general, a higher nitrile content will provide a higher glass transition temperature ($T_g$). As $T_g$ increases and as nitrile content increases, the copolymer becomes more plastic, less rubbery, more rigid, less compressible, and exhibits poorer wetting ability onto surfaces of high polarity.

The copolymer must have a single $T_g$ and it must be no higher than about $-25°$ C. A copolymer having a single $T_g$ is a random copolymer, e.g., it exhibits the non-repeating structure A—B—B—A—B—A—B—A—A—B. If a copolymer has multiple $T_g$'s, the copolymer is a segmented copolymer, i.e., it exhibits the repeating structure A—A—A—A—B—B—B—B—A—A—A—A—B—B—B—B. If one portion of the molecule has excessive nitrile content, i.e., rigid material, that portion of the copolymer exhibits poor contact and wetting ability to polar surfaces; if the other portion of the molecule has excessive butadiene, that portion of the copolymer exhibits lower polarity and poorer adhesion to polar surfaces.

The Mooney viscosity of the copolymer must be at least 95, preferably about 120 to about 150. As used herein, Mooney viscosity was measured according to ASTM D1646-87 under the following conditions: 100° C., 4 minutes. As Mooney viscosity increases, molecular weight increases. Increased molecular weight gives increased cohesive strength. Increased cohesive strength is desired to minimize cohesive failure.

The copolymer should have a vinyl content ($CH_2=CH-$) of less than about 10% by weight. Polymers having a high vinyl content, i.e., greater than 10% by weight, tend to associate when subjected to severe storage conditions, e.g., high temperatures, ultraviolet radiation, heat, oxygen. The vinyl groups in the polymer tend to physically associate, thereby making the molecule superficially larger. This phenomenon restricts the movement of part or all of the molecule, consequently reducing the wetting or degree of contact of the molecule onto a polar surface and reducing the diffusion of part or all of the molecule onto the polar surface, resulting in a reduction of the bond strength between the adhesive and the adherend, e.g., the lip of a container.

The copolymer should be essentially free of cross-links. Cross-linking tends to result in the production of larger molecules, resulting in the molecules insolubility in conventional coating solvents. Chemical bonds formed via cross-linking tend to severely restrict the movement of part or all of the molecule, thereby reducing the wetting of and contact with the polar surface, and consequently reducing hydrogen bonding and diffusion of part or all of the molecule onto the surface of polar substrates.

The invention provides an adhesive, which may be substantially nontacky, but surprisingly is capable under moderate pressure at ordinary room temperatures of bonding to many articles so aggressively that the bonds can be stronger than the articles. Although the bonds reach full strength more quickly when heat is applied, testing indicates that a bond initiated at ordinary room temperature under moderate pressure reaches substantially the same strength overnight as does a bond initiated while applying heat. Even so, an article such as a label which is bonded to a substrate such as a container can readily be repositioned during a reasonably long period of time after being formed, whether or not heat is employed in initiating the bond. In spite of such repositionability, a bond initiated at room temperature or at a moderately elevated temperature under moderate pressure has sufficient initial strength that there is no delay in operating high-speed equipment, such as that typically used for sealing containers. Accordingly, the novel adhesive should make it feasible to design and manufacture higher speed equipment for such purposes as sealing blister packs, sealing containers, and applying labels without using heat sealing equipment.

A variety of other ingredients may be incorporated into the composition containing the butadiene-nitrile copolymer, provided that neither they nor the amount added change the pressure-activated nature of the adhesive. In other words, additives should provide little or no finger tack and should not adversely affect the cohesive and adhesive strength of the adhesive. Such ingredients include fillers, antioxidants, ultraviolet light stabilizers, colorants, adhesion modifiers, and the like.

The adhesive of the present invention can be used to form the adhesive layer in the following products: labels, tapes, innerseals for containers. Tapes that utilize the adhesive of the present invention typically comprise a backing bearing a layer of the adhesive thereon. Backings that are particularly suitable for the adhesive tape of this invention are made from polymers, such as for example, polyvinyl chloride, polycarbonate, polyesters, polyvinylidene chloride, and polystyrene.

The adhesive compositions of the present invention can be readily prepared. A butadiene-acrylonitrile copolymer of this invention can be prepared according to the following procedure:

The ingredient for a typical polymerization recipe is shown in Table 1.

TABLE 1

| Ingredient |
| --- |
| Butadiene |
| Acrylonitrile |
| Water |
| Emulsifier |
| Modifier |
| Electrolytes |
| Catalyst |
| Activator |
| Short-stop |

TABLE 1-continued

| Ingredient |
| --- |
| Stabilizer |

1. The monomers are emulsified in water and agitated at a constant temperature.
2. A catalyst is added to generate free radicals and initiate polymerization.
3. When the monomers have copolymerized to the desired degree, a short-stop is added to inactivate the catalyst.
4. The residual monomers are removed from the emulsion by degassing and vacuum distillation.
5. A stabilizer, or antioxidant, is added to the latex to protect the polymer during the drying and storage periods.
6. The latex is coagulated by mixing it with an aqueous solution of an inorganic salt; the polymer agglomerates into small crumbs.
7. Water soluble materials are removed from the crumbs by washing with water.

Emulsifiers suitable for the process include rosin acids and derivatives thereof, fatty acids and derivatives thereof, and synthetic detergents. Modifiers suitable for the process include mercaptans and derivatives thereof, aroyl disulfides, aliphatic disulfides, and alkyl sulfonates. Electrolytes suitable for the process include postassium laurate, sodium chloride, and ammonium chloride. Catalysts suitable for the process include water-soluble heavy metal compounds, such as ferric sulfate, cobaltous chloride. Activators suitable for the process include peroxides without reducing agents, e.g., organic peroxides, hydroperoxides, peroxides with redox activators, e.g., organic peroxides with metal ions, peroxides with amines. Short-stops suitable for the process include sodium-hydrogen sulfite, hydroquinones. Stabilizers suitable for the process include amines, e.g., octylated diphenylamine and phenolics, e.g., tertiary butyl-p-cresol.

The primary reaction is shown schematically below:

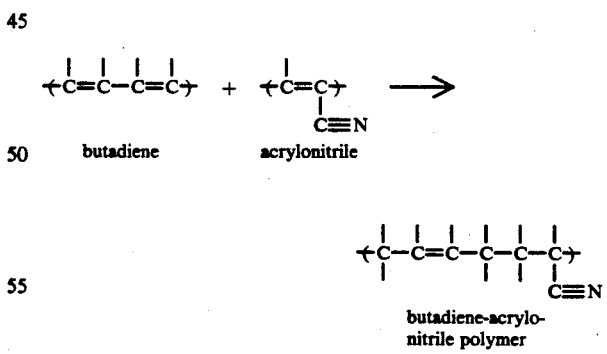

Other ingredients such as fillers, antioxidants, ultraviolet light stabilizers, colorants, adhesion modifiers and the like may also be added with the butadiene-acrylonitrile copolymer.

The adhesive composition previously described is particularly useful for securing innerseals to the lips of containers, more particularly to containers made of high polarity material.

Innerseals utilizing the adhesive composition of this invention may be provided in any desired form. Thus, it may be provided in individually designed shapes to cover a particular container opening or it may be provided in bulk either in the form of large sheets or rolls from which a desired shape and size may be subsequently removed.

The adhesive composition is pressure-activated, that is, it does not adhere to a surface until it has been pressed, for example, by a force applied. The force for applying the pressure can be a shear force, e.g., resulting from a twisting action, so long as sufficient pressure is applied so that the adhesive substantially contacts the surface to which it is to be adhered.

A variety of techniques may be utilized to apply the adhesive to a substrate. For example, adhesives prepared by solution techniques may be applied to the substrate at room temperature (e.g., 25° C.) by, for example, solvent or extrusion coating, Mayer bar coating, or rotogravure coating techniques. After application of the adhesive, the solvent may be removed by heating the substrate at a temperature, e.g., 65° C., and for a time sufficient to remove the solvent but insufficient to degrade either the adhesive or the substrate, e.g., 30 seconds.

The present invention is further described by the following example wherein all amounts are parts or percentages by weight unless otherwise specified.

EXAMPLE 1

The following materials in the amounts indicated were used to prepare the adhesive of Example 1.

| Ingredients | Amount (parts by weight) |
| --- | --- |
| Acrylonitrile | 22 |
| Butadiene | 78 |
| Distilled water | 180 |
| Alkali salt of dehydroabietic acid | 3.6 |
| Tert-dodecyl mercaptan | 0.4 |
| Hydrogen peroxide (20%) | 0.4 |
| Iron sulfate heptahydrate | 0.02 |
| Sodium hyposulfite | 1.0 |
| Trinonyl phenyl phosphite | 3.0 |

The distilled water, the alkali salt of dehydroabietic acid, the tert-dodecyl mercaptan, the butadiene, and 12 parts acrylonitrile, were introduced into a clean container.

The resulting emulsion was agitated for about five minutes; then the hydrogen peroxide and iron sulfate heptahydrate were added; the emulsion continued to be agitated while the temperature was held at 7° C. When the level of conversion reached about 35%, the remainder of the acrylonitrile was added to the container.

Polymerization was continued at 7° C. for about 16 hours. At that point, the sodium hyposulfate and trinonyl phenyl phosphite was added to terminate the polymerization.

Alum was added to coagulate the polymerized latex into a crumb form, and the crumb-like material was thoroughly washed with water to eliminate excess precipitated agents, such as emulsifier, modifier, etc. The crumb-like material was then dried. The Mooney viscosity of the copolymer was 130, when measured according to ASTM D1646-87 at 100° C. for 4 minutes. The acrylonitrile content of the copolymer was 25% by weight. The Tg of the copolymer was below −25° C., the vinyl content of the copolymer was below 10% by weight, and there were little or no cross-links in the copolymer.

The following tables compare the peel adhesion of the adhesive composition of the present invention with adhesives that are commercially available. "Chemigum N917" butadiene-acrylonitrile rubber is manufactured by The Goodyear Tire and Rubber Company. "Hycar 1094-80", "Hycar 1034-60", "Hycar 1053", "Hycar 1043", "Hycar VT-355", "Hycar 1022" butadiene-acrylonitrile rubbers are manufactured by The B.F. Goodrich Co. "Krynac 34.140" butadiene-acrylonitrile rubber is manufactured by Polysar Corp. Ltd. "Nipol DN218" butadiene-acrylonitrile rubber is manufactured by Nippon Zeon Co., Ltd.

Table I compares peel adhesion of a sample of the present invention with commercially available materials having a Mooney viscosity value of less than 95. The peel adhesion of the present invention significantly exceeds that of the commercially available materials.

TABLE I

| Acrylonitrile-butadiene rubber | | Mooney viscosity (ML 1 + 4(100° C.)) | Peel adhesion (180°)[1] | | | |
| --- | --- | --- | --- | --- | --- | --- |
| Trade name | Acrylonitrile content (%) | | UPVC | PET | PC | PVDC |
| "Chemigum N917" | 22 | 63 | 56 | 46 | 90 | 25 |
| "Hycar 1094-80" | 21 | 80 | 47 | 53 | 50 | 39 |
| "Hycar 1034-60" | 21 | 55 | 38 | 41 | 36 | 30 |
| "Hycar 1053" | 29 | 60 | 38 | 23 | 43 | 10 |
| "Hycar 1043" | 29 | 80 | 10 | 10 | 14 | 3 |
| Example 1 | 25 | 130 | 200 | 200 | 163 | 116 |

[1]UPVC = unplasticized polyvinyl chloride
PET = polyethylene terephthalate
PC = polycarbonate
PVDC = polyvinylidene dichloride Table II compares peel adhesion of a sample of the present invention with a commercially available material having a nitrile content in excess of 31% by weight. The peel adhesion of the present invention significantly exceeds that of the commercially available material.

TABLE II

| Acrylonitrile-butadiene rubber | | Mooney viscosity (ML 1 + 4(100° C.)) | Peel adhesion (180°)[1] | | | |
| --- | --- | --- | --- | --- | --- | --- |
| Trade name | Acrylonitrile content (%) | | UPVC | PET | PC | PVDC |
| "Krynac 34.140" | 34 | 140 | 16.5 | 18 | 24 | 27 |

TABLE II-continued

| Acrylonitrile-butadiene rubber | | Mooney | Peel adhesion (180°)[1] | | | |
|---|---|---|---|---|---|---|
| Trade name | Acrylonitrile content (%) | viscosity (ML 1 + 4(100° C.)) | UPVC | PET | PC | PVDC |
| Example 1 | 25 | 130 | 200 | 200 | 163 | 116 |

[1]UPVC = unplasticized polyvinyl chloride
PET = polyethylene terephthalate
PC = polycarbonate
PVDC = polyvinylidene dichloride Table III compares peel adhesion of a sample of the present invention with commercially available materials having a nitrile content in excess of 31% by weight and Mooney viscosity value of less than 95.

TABLE III

| Acrylonitrile-butadiene rubber | | Mooney | Peel adhesion (180°)[1] | | | |
|---|---|---|---|---|---|---|
| Trade name | Acrylonitrile content (%) | viscosity (ML 1 + 4(100° C.)) | UPVC | PET | PC | PVDC |
| "Hycar VP-355" | 30 | 55 | 38 | 40 | 54 | 31 |
| "Hycar 1022" | 33 | 50 | 55 | 50 | 56 | 33 |
| "Nipol DN 218" | 33 | 57 | 30 | 35 | 55 | 34 |
| Example 1 | 25 | 130 | 200 | 200 | 163 | 116 |

[1]UPVC = unplasticized polyvinyl chloride
PET = polyethylene terephthalate
PC = polycarbonate
PVDC = polyvinylidene dichloride Table IV compares peel adhesion of a sample of the tape made with the adhesive of the present invention with a typical commercially available pressure-sensitive adhesive tape having a high level of peel adhesion.

TABLE IV

| | Peel adhesion (180°)[1] | | | |
|---|---|---|---|---|
| Pressure-sensitive adhesive tape | UPVC | PET | PC | PVDC |
| Transparent film tape (622, Minnesota Mining and Manufacturing Co.) | 124 | 132 | 118 | 67 |
| Filament tape (891, Minnesota Mining and Manufacturing Co.) | 50 | 54 | 60 | 27 |
| Tape (8411, Minnesota Mining and Manufacturing Co.) | 30 | 33 | 29 | 20 |
| Adhesive-based tape of this invention | 200 | 200 | 163 | 116 |

[1]UPVC = unplasticized polyvinyl chloride
PET = polyethylene terephthalate
PC = polycarbonate
PVDC = polyvinylidene dichloride In each of Tables I, II, and III, the data show that the adhesive of the present invention provides higher peel adhesion (180°) than do commercially available acrylonitrile-butadiene rubber adhesives. In Table IV, the data show that the pressure-sensitive adhesive tape of the present invention provides higher peel adhesion (180°) than do commercially available pressure-sensitive adhesive tapes.

Peel adhesion (180°) was determined in the following manner:

1. Unplasticized polyvinyl chloride (UPVC) sheet (6 mil thickness), polyethylene terephthalate (PET) sheet (6 mil thickness), polycarbonate (PC) sheet (6 mil thickness), and polyvinylidene chloride (PVDC) sheets (6 Mill thickness) were used as the adherends.

2. The heat sealable surface of a PET film (850 film, ICI America, 0.8 mil thickness) was coated with a solution of acrylonitrile-butadiene copolymer (10% solids in toluene) by means of knife coating at a wet coat thickness of 5 mil. The coated PET film was air dried at room temperature for five minutes and then oven dried at 150° F. for one hour to form a film strip.

3. The PVC sheet, the PET sheet, the PC sheet, and the PVDC sheet were cut into 1 in. × 6 in. strips by means of a razor blade, and the film was cut into a 1 in. × 11 in. strip by means of a razor blade.

4. The film strip was pressed onto each adherend sheet at a pressure of 40 psi for 5 minutes.

5. Peel adhesion was then determined with a TMS Instron apparatus (Instron Corp., Canton, MA). The innerseal/adherend samples were clamped with jaws on the crosshead on the Instron apparatus and then peeled at a 180° angle at 12 in./min extension rate. Peel adhesion results were reached on chart paper running at a rate of 5 in./min. Peel adhesion was expressed in ounces.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. An adhesive composition comprising an amorphous butadiene-nitrile random copolymer having a single glass transition temperature no higher than about −25° C., a nitrile content no higher than about 31% by weight, a Mooney viscosity of at least 95 (measured according to ASTM D1646-87 at 100° C. for 4 minutes), a vinyl content of no greater than 10% by weight, said composition being substantially free of cross-links, provided that said composition is free of any additive that provides more than little or no finger tack or that adversely affects the cohesive and adhesive strength of the adhesive composition.

2. The composition of claim 1, wherein the nitrile content of said adhesive composition is from about 18% by weight to about 30% by weight.

3. The composition of claim 1, wherein the Mooney viscosity of said adhesive composition is from about 120 to about 150.

4. The composition of claim 1, wherein the nitrile moiety of said adhesive composition is acrylonitrile.

5. The composition of claim 1, wherein the nitrile moiety of said adhesive composition is methacrylonitrile.

6. A tape comprising a backing bearing on at least one major surface thereof the adhesive composition of claim 1.

7. A sheet comprising a backing bearing on at least one major surface thereof the adhesive composition of claim 1.

8. A label comprising a backing bearing on at least one major surface thereof the adhesive composition of claim 1.

* * * * *